US012675514B2

(12) United States Patent
Phiri et al.

(10) Patent No.: US 12,675,514 B2
(45) Date of Patent: Jul. 7, 2026

(54) SYSTEMS AND METHODS FOR RUNTIME INPUT AND OUTPUT CONTENT MODERATION FOR LARGE LANGUAGE MODELS

(71) Applicant: JPMORGAN CHASE BANK, N.A., New York, NY (US)

(72) Inventors: Charles C. Phiri, New York, NY (US); Eyal Lantzman, Cambridge (GB); Suman Kumar Addanki, Chadds Ford, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/757,137

(22) Filed: Jun. 27, 2024

(65) Prior Publication Data

US 2025/0005060 A1     Jan. 2, 2025

Related U.S. Application Data

(60) Provisional application No. 63/510,788, filed on Jun. 28, 2023.

(51) Int. Cl.
| | |
|---|---|
| *G06F 16/00* | (2019.01) |
| *G06F 16/334* | (2025.01) |
| *G06F 21/62* | (2013.01) |
| *G06F 40/40* | (2020.01) |

(52) U.S. Cl.
CPC ...... *G06F 16/3344* (2019.01); *G06F 21/6245* (2013.01); *G06F 40/40* (2020.01)

(58) Field of Classification Search
CPC ... G06F 16/3344; G06F 21/6245; G06F 40/40
USPC .......................................................... 707/769
See application file for complete search history.

(56) References Cited

U.S. PATENT DOCUMENTS

| | | | | |
|---|---|---|---|---|
| 11,829,486 | B1 * | 11/2023 | Lambotte ................. | G06N 3/09 |
| 11,995,411 | B1 * | 5/2024 | Qadrud-Din ............ | G06F 40/40 |
| 2020/0351244 | A1 * | 11/2020 | Moore ..................... | H04L 63/20 |
| 2023/0274094 | A1 * | 8/2023 | Tunstall-Pedoe ....... | G06F 40/30 |
| | | | | 704/9 |
| 2024/0202464 | A1 * | 6/2024 | Poirier .................... | G06F 40/20 |
| 2024/0249318 | A1 * | 7/2024 | Spiegel ................... | H04L 51/02 |
| 2024/0403341 | A1 * | 12/2024 | Berglund ............ | G06F 16/3326 |
| 2024/0427994 | A1 * | 12/2024 | Odland ............... | G06F 21/6245 |

(Continued)

FOREIGN PATENT DOCUMENTS

| | | | | |
|---|---|---|---|---|
| WO | WO-2023053101 A1 * | 4/2023 | .......... | G06F 16/986 |

*Primary Examiner* — Monica M Pyo
(74) *Attorney, Agent, or Firm* — GREENBERG TRAURIG LLP

(57)     ABSTRACT

Systems and methods for runtime input and output content moderation for large language models are disclosed. In one embodiment, a method may include: (1) receiving, by a moderator computer program executed by an electronic device, a query for a large language model-based computer program from a user application; (2) applying, by the moderator computer program, a rule to the query; (3) submitting, by the moderator computer program, the query to the large language model-based computer program; (4) receiving, by the moderator computer program, a response to the query from the large language model-based computer program; and (5) returning, by the moderator computer program, the response to the user application.

9 Claims, 3 Drawing Sheets

(56) References Cited

U.S. PATENT DOCUMENTS

| | | | |
|---|---|---|---|
| 2024/0430233 A1* | 12/2024 | Tanner | H04L 63/0245 |
| 2025/0013773 A1* | 1/2025 | Kamyshenko | G06F 21/6227 |
| 2025/0278526 A1* | 9/2025 | Roper, Jr. | G06F 30/15 |

* cited by examiner

SYSTEMS AND METHODS FOR RUNTIME INPUT AND OUTPUT CONTENT MODERATION FOR LARGE LANGUAGE MODELS

RELATED APPLICATIONS

This application claims priority to, and the benefit of, U.S. Provisional Patent Application Ser. No. 63/510,788, filed Jun. 28, 2023, the disclosure of which is hereby incorporated, by reference, in its entirety.

BACKGROUND OF THE INVENTION

1. Field of the Invention

Embodiments relate to systems and methods for runtime input and output content moderation for large language models.

2. Description of the Related Art

Large language models are machine learning models that utilize deep learning algorithms to process and understand language. Large language models are commonly used in text translations, by chatbots, etc. The inputs to large language models, and outputs from large language models, can be used maliciously, such as by trying to jailbreak the large language model, or cause the large language model to output something incorrect or inappropriate.

SUMMARY OF THE INVENTION

Systems and methods for runtime input and output content moderation for large language models are disclosed. In one embodiment, a method may include: (1) receiving, by a moderator computer program executed by an electronic device, a query for a large language model-based computer program from a user application; (2) applying, by the moderator computer program, a rule to the query; (3) submitting, by the moderator computer program, the query to the large language model-based computer program; (4) receiving, by the moderator computer program, a response to the query from the large language model-based computer program; and (5) returning, by the moderator computer program, the response to the user application.

In one embodiment, the rules prohibit queries that include sensitive information.

In one embodiment, the method may also include masking, by the moderator computer program, sensitive information in the query before submitting the query to the large language model-based computer program.

In one embodiment, the rules prohibit queries that include a script or executable content.

In one embodiment, the method may also include removing, by the moderator computer program, the script or executable content in the query before submitting the query to the large language model-based computer program.

In one embodiment, the method may also include applying, by the moderator computer program, the rule to the response.

In one embodiment, the rule removes objectionable content from the response.

According to another embodiment, a system may include a user electronic device executing a user application; a large language model-based computer program; and an electronic device executing a moderator computer program that may be configured to receive a query for the large language model-based computer program from the user application to apply a rule to the query, to submit the query to the large language model-based computer program, to receive a response to the query from the large language model-based computer program and to return the response to the user application.

In one embodiment, the rules prohibit queries that include sensitive information.

In one embodiment, the moderator computer program may be configured to mask sensitive information in the query before submitting the query to the large language model-based computer program.

In one embodiment, the rules prohibit queries that include a script or executable content.

In one embodiment, the moderator computer program may be configured to remove the script or executable content in the query before submitting the query to the large language model-based computer program.

In one embodiment, the moderator computer program may be configured to apply the rule to the response.

In one embodiment, the rule removes objectionable content from the response.

According to another embodiment, a non-transitory computer readable storage medium may include instructions stored thereon, which when read and executed by one or more computer processors, cause the one or more computer processors to perform steps comprising: receiving a query for a large language model-based computer program from a user application; applying a rule to the query; submitting the query to the large language model-based computer program; receiving a response to the query from the large language model-based computer program; and returning the response to the user application.

In one embodiment, the rules prohibit queries that include sensitive information.

In one embodiment, the non-transitory computer readable storage medium may also include instructions stored thereon, which when read and executed by the one or more computer processors, cause the one or more computer processors to perform steps comprising: masking sensitive information in the query before submitting the query to the large language model-based computer program.

In one embodiment, the rules prohibit queries that include a script or executable content.

In one embodiment, the non-transitory computer readable storage medium may also include instructions stored thereon, which when read and executed by the one or more computer processors, cause the one or more computer processors to perform steps comprising: removing the script or executable content in the query before submitting the query to the large language model-based computer program.

In one embodiment, the non-transitory computer readable storage medium may also include instructions stored thereon, which when read and executed by one or more computer processors, cause the one or more computer processors to perform steps comprising: applying the rule to the response to remove objectionable content from the response.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for runtime input and output content moderation for large language models.

Embodiments may provide content moderation and may provide security against attacks on or using a large language model.

Figure 1:
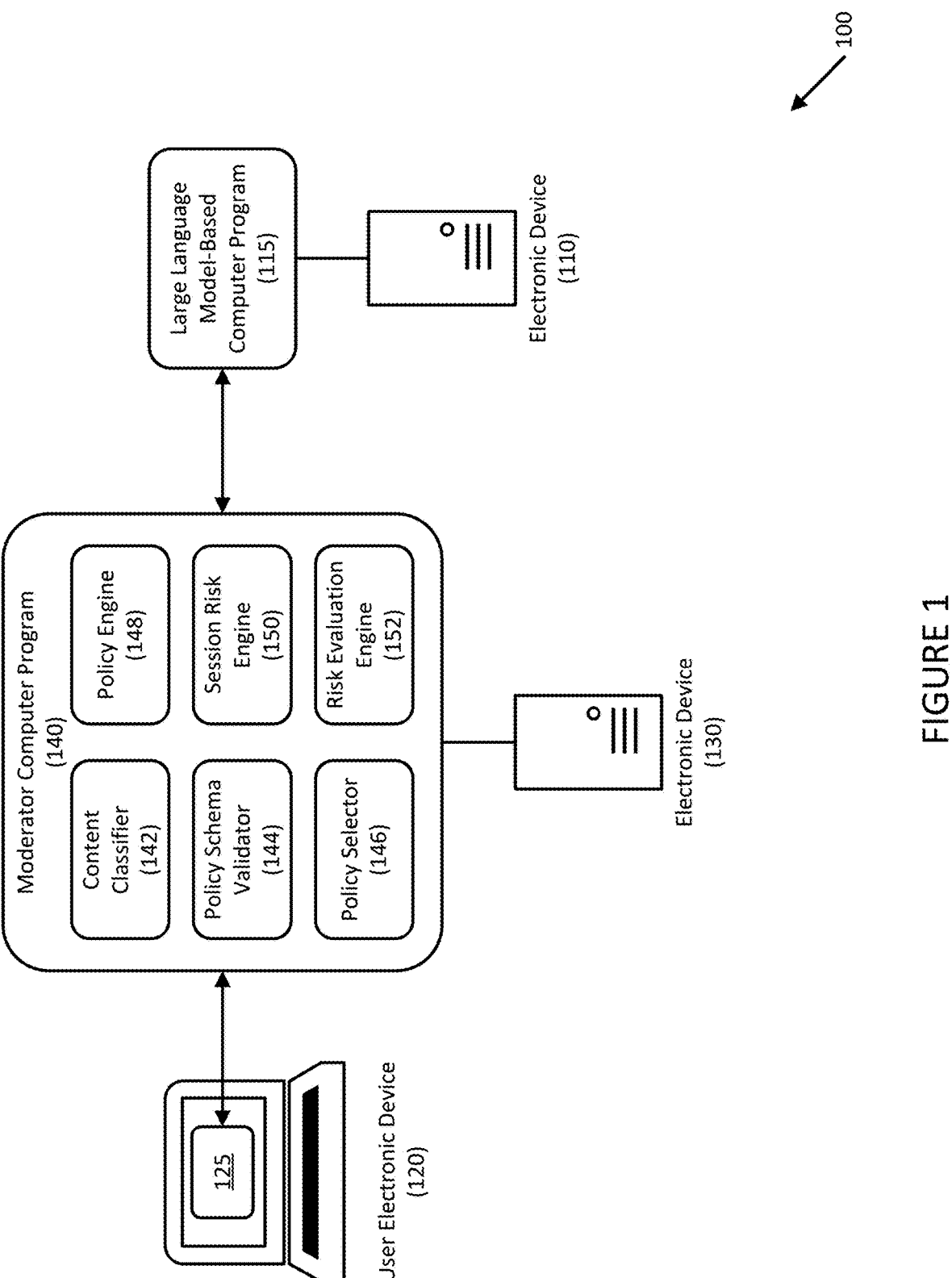
FIG. 1 illustrates a system for runtime input and output content moderation for large language models according to an embodiment.

Referring to FIG. 1, a system for runtime input and output content moderation for large language models is disclosed according to an embodiment. System 100 may include electronic device 110, which may be a server (e.g., physical and/or cloud based), a computer (e.g., workstation, desktop, laptop, notebook, tablet, etc.), etc. Electronic device 110 may execute one or more computer programs or applications, including large language model-based computer program 115. Large language model-based computer program 115 may be a translation computer program, a chat bot, an artificial intelligent conversationalist, etc.

Large language model-based computer program 115 may be, for example, based on a Generative Pre-trained Transformer ("GPT") large language model.

Large language model-based computer program 115 may interface with moderator computer program 140, which may be executed by electronic device 130. Electronic device 130, like electronic device 110, may be a server (e.g., physical and/or cloud based), a computer (e.g., workstation, desktop, laptop, notebook, tablet, etc.), etc. Electronic device 130 may be within a firewall for an organization or similar.

Moderator computer program 140 may include, for example, content classifier 142, policy schema validator 144, policy selector 146, policy engine 148, session risk engine 150, and risk evaluation engine 152. Moderator computer program 140 may receive queries for large language model-based computer program 115, and may review the queries for compliance with organization standards. For example, the queries may be checked to verify that they are appropriate for the organization (e.g., not seeking an offensive or inappropriate response from large language model-based computer program 115), not an attempt to hack or jailbreak large language model-based computer program 115, etc. It may also verify that the queries do not include private or confidential information, such as personally identifiable information, etc.

Content classifier 142 may receive a query, and may identify the type of content so that an appropriate policy to apply to the query may be selected. For example, content classifier 142 may filter the query based on known patterns, may redirect the query based on known mime-types, such as text, image, audio, and video. For example, content classifier 142 may redirect the query for human inspection.

Policy schema validator 144 may determine if a policy for the content is restricted by a schema. If it is, any violations on the structure of the document or content may be rejected. This reduces the computation budget.

Policy selector 146 may select and retrieve a policy based on the mime-type from a policy database (not shown), such as frameworks, regional regulations, policies, etc. that can be expressed as a schema. Examples of policies may include the National Institute of Science and Technology (NIST)

Risk Management Framework (RMF), the United Kingdom Artificial Intelligence regulations, etc.

Policy engine 148 may evaluate the query in view of the selected policy. Policy engine 148 may output a score based on the evaluation.

Session risk engine 150 may assess the risk associated with the session, such as behavioral risks, transient risks, locally relevant risks, etc. Examples of risks may include a risk due to interactions with the model at runtime such as prompts that circumvent guardrails (e.g., jailbreaking), models generating content that is not acceptable, usage patterns designed to generate excess cost, data exfiltration, model stealing techniques, etc.

Session risk engine 150 output a score based on the evaluation.

Risk evaluation engine 152 may generate a combined score for the policy risk from policy engine 148, and session risks from session risk engine 150. Risk evaluation engine 152 may assign a weight to each score, and may combine them based on the weights.

In one embodiment, a gateway load balancer (not shown) may also check for network traffic access patterns to detect anomalies, such as DDoS attacks and other malicious accesses.

Moderator computer program 140 may also verify that the user submitting the query is entitled to access large language model-based computer program 115.

Queries that moderator computer program 140 identifies as inappropriate, or having a risk score (e.g., policy risk score, session risk score, or combined risk score) above a threshold, may be rejected.

Moderator computer program 140 may also review the responses from large language model-based computer program 115, and may prevent responses that it determines to be inappropriate from being returned to user application 125.

In one embodiment, moderator computer program 140 may filter or edit responses that it determines to be inappropriate. In one embodiment, a feedback loop may be provided that provides feedback to fine tune the model (e.g., using reinforcement learning with human feedback).

User electronic device 120 may be any suitable electronic device that may be used by a user to submit a request to large language model-based computer program 115. Examples include computers, smart devices (e.g., smart phones, smart watches, etc.), Internet of Things (IoT) appliances, etc. User electronic device 120 may execute user application 125, which may be a browser, a program, etc.

Figure 2:
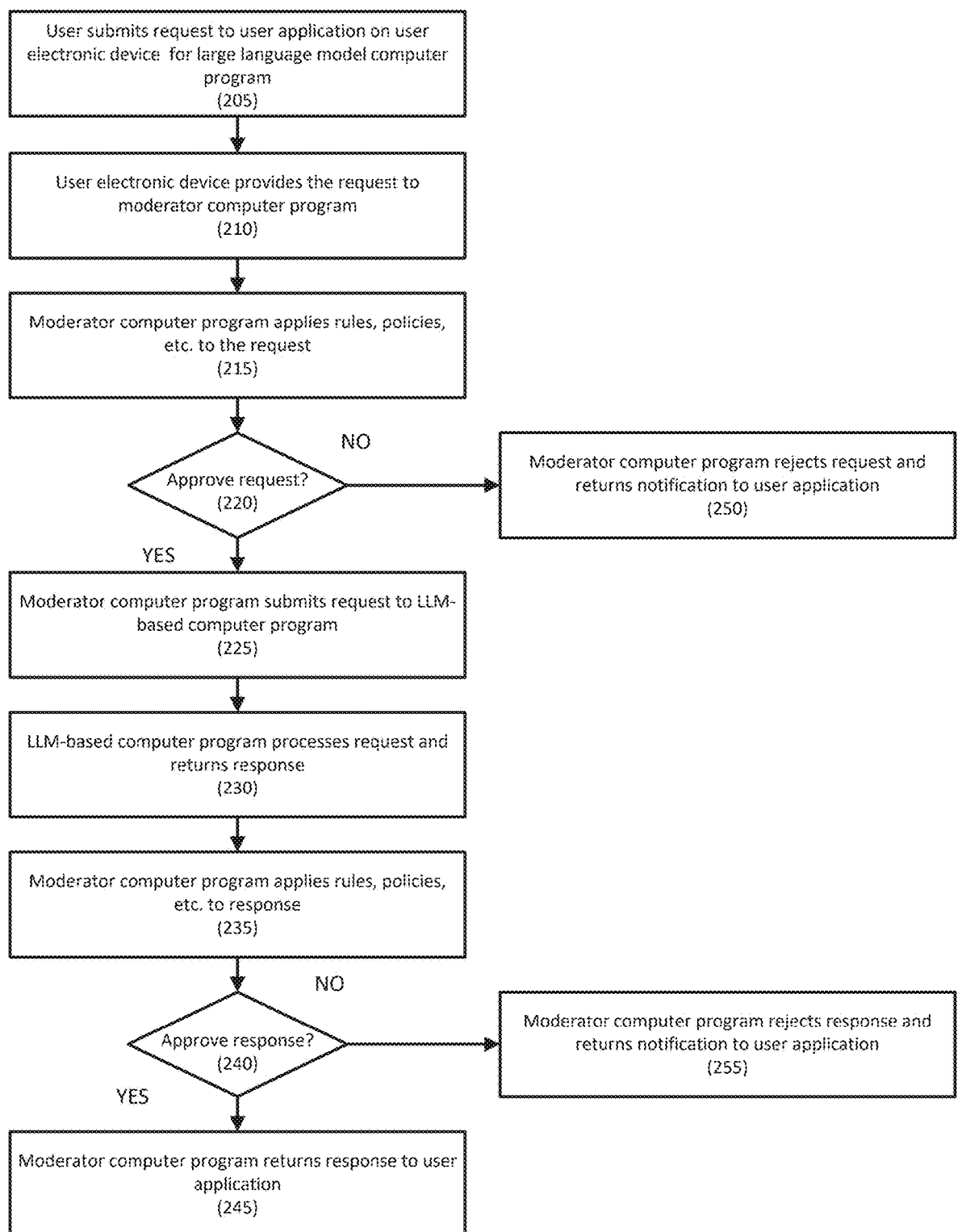
FIG. 2 illustrates a method for runtime input and output content moderation for large language models according to an embodiment.

Referring to FIG. 2, a method for runtime input and output content moderation for large language models is disclosed according to an embodiment.

In step 205, a user may submit a query for a large language model-based computer program to a user application on a user electronic device.

In step 210, the user electronic device may provide the query to a moderator computer program. The moderator computer program may be within an organization.

In step 215, the moderator computer program may apply rules, policies, etc. to the query. In one embodiment, the rules, policies, etc. may be specific to the organization. For example, the rules and/or policies may prohibit queries for a certain subject matter or topic, may prohibit queries that may elicit an inappropriate response from the LLM-based computer program, may prevent queries that seek to improperly manipulate, damage, jailbreak, etc. the LLM-based computer program (e.g., comprise a script of similar executable content), may prevent queries including sensitive information (e.g., personally identifiable information), etc.

In one embodiment, the rules may be set by, for example, an administrator; in another embodiment, the rules may be dynamic and may be based on results from prior requests and responses from the LLM-based computer program. For example, a machine-learning model, a neural network, etc. may be trained with historical requests and responses and may predict whether a request should be rejected.

In one embodiment, the moderator computer program may review the query using a traffic pattern analysis for Distributed Denial of Service (DDoS) attacks and other anomalous events. The moderator computer program may terminate the process if the traffic patterns for the query is determined to be malicious or of an unknown type.

In one embodiment, the moderator computer program may use a content classifier to identify a type of content in the query to select an appropriate policy to apply to the query. For example, the content classifier may filter the query based on known patterns, may redirect the query based on known mime-types, such as text, image, audio, and video. A policy selector may be used to select the appropriate policy from a policy database.

The moderator computer program may also use a policy schema validator to apply restrictions from a schema, such as type and structure restrictions on input. For example, the moderator computer program may apply patterns and type restrictions, and may add links to external schema, thereby extending the policy checks beyond the rule generic rule-based structure.

The moderator computer program may use a policy engine to evaluate the query in view of the selected policy, and a session risk engine to assess the risk associated with the session, such as behavioral risk, transient risks, locally relevant risks, etc. The scores may be weighted and combined by a risk evaluation engine, resulting in a combined risk score.

In step 220, if the moderator computer program approves the query (e.g., the query complies with the organization rules and policies, does not contain sensitive information, has a policy risk score, a session risk score, or a combined risk score below a threshold, etc.), in step 225, the moderator computer program may submit the query to the LLM-based computer program.

In one embodiment, the moderator computer program may modify the query to comply with the rules and policies. For example, the moderator computer program may remove scripts or certain executable content from the query, may mask or remove sensitive information from the query, etc.

For example, assuming that a pattern is known (e.g., a numeric pattern such as a credit card pattern), elements may be replaced with surrogates that do not violate the original data structure. As another example, personal identifiable information, such as named entities, may be replaced with placeholders without affecting upstream computation. As another example, regional variations of privacy policies (e.g., GDPR, CCPA, etc.) may be applied to known content.

In step 230, the LLM-based computer program may process the request and may return a response to the moderator computer program.

In step 235, the moderator computer program may receive the response and may apply organization policies and rules to the response. For example, the moderator computer program may apply rules and/or policies that prevent inappropriate responses from being returned to the user computer application, such as responses including certain topics, words, etc.

In one embodiment, the rules may be set by, for example, an administrator; in another embodiment, the rules may be dynamic and may be based on feedback from prior responses that were delivered to the user computer application. For example, a machine-learning model, a neural network, etc. may be trained with the responses and the feedback to predict whether a response should be rejected.

In one embodiment, the result of the application of the rules and/or policies to the response, as well as any feedback received on delivered responses, may be used to train the machine-learning model or neural network that evaluates the requests.

In one embodiment, the moderator computer program may use the content classifier, policy selector, policy engine, session risk engine, and risk evaluation engine to generate a risk score for the response similar to discussed above with regard to the query.

In step 240, if the moderator computer program may approve the response (e.g., the response complies with organization policies and rules), in step 245, the moderator computer program may return the response to the user application.

If, in step 220, the moderator computer program rejected the query, in step 250, the moderator computer program may return a notification to the user application. In one embodiment, the notification may be a generic notification, such as "service unavailable."

If, in step 240, the moderator computer program rejected the response, in step 255, the moderator computer program may reject the response and may return a notification to the user application.

Similar to step 250, the response may be provided only if it is not considered to be a security risk. Otherwise, a generic response, such as "service unavailable," may be provided.

Figure 3:
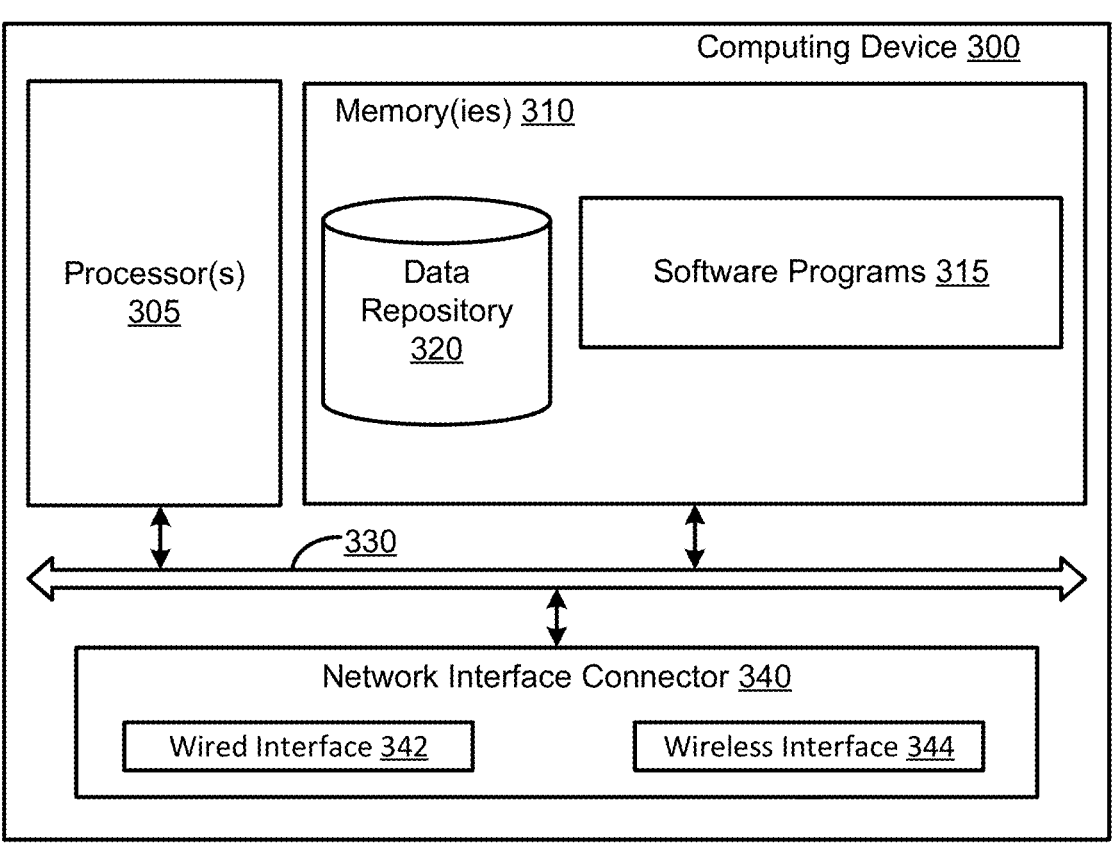
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a moderator computer program executed by an electronic device, a query for a large language model-based computer program from a user application;

applying, by the moderator computer program, a query rule to the query, wherein the query rule prohibits queries comprises executable content;

modifying, by the moderator computer program, the query by removing the executable content from the query;

submitting, by the moderator computer program, the modified query to the large language model-based computer program;

receiving, by the moderator computer program, a response to the modified query from the large language model-based computer program;

applying, by the moderator computer program, a response rule to the response, wherein the response rule prevents the response from being returned in response to the response comprising a security risk;

approving, by the moderator computer program, the response from the large language model-based computer program based on the rule applied to the response, wherein if the moderator computer program does not approve the response, the moderator computer program prevents the response from being returned and returns an alternate notification to the user application;

training, by a feedback loop, the large language model-based computer program to predict whether the response should be rejected; and returning, by the moderator computer program, the response to the user application.

2. The method of claim 1, wherein the query rule further prohibits queries comprising sensitive information.

3. The method of claim 1, further comprising:

masking, by the moderator computer program, sensitive information in the query before submitting the query to the large language model-based computer program.

4. A system, comprising:

a user electronic device executing a user application;

a large language model-based computer program; and an electronic device executing a moderator computer program that is configured to receive a query for the large language model-based computer program from the user application to apply a query rule to the query, wherein the query rule prohibits queries comprises executable content, to modify the query by removing the executable content from the query, to submit the modified query to the large language model-based computer program, to receive a response to the modified query from the large language model-based computer program, to apply a response rule to the response, to approve the response from the large language model-based computer program based on the rule applied to the response, if the moderator computer program does not approve the response, the moderator computer program prevents the response from being returned and returns an alternate notification to the user application, to train the large language model-based computer program by a feedback loop to predict whether the response should be rejected, and to return the response to the user application.

5. The system of claim 4, wherein the query rule further prohibits queries comprising sensitive information.

6. The system of claim 4, wherein the moderator computer program is configured to mask sensitive information in the query before submitting the query to the large language model-based computer program.

7. A non-transitory computer readable storage medium, including instructions stored thereon, which when read and executed by one or more computer processors, cause the one or more computer processors to perform steps comprising:

receiving a query for a large language model-based computer program from a user application;

applying a query rule to the query, wherein the query rule prohibits queries comprises executable content;

modifying the query by removing the executable content from the query;

submitting the modified query to the large language model-based computer program;

receiving a response to the modified query from the large language model-based computer program;

applying a response rule to the response, wherein the response rule prevents the response from being returned in response to the response comprising a security risk;

approving the response from the large language model-based computer program based on the rule applied to the response, wherein if the response is not approved, an alternate notification to the user application;

training, by a feedback loop, the large language model-based computer program to predict whether the response should be rejected; and returning the response to the user application.

8. The non-transitory computer readable storage medium of claim 7, wherein the query rule further prohibits queries comprising sensitive information.

9. The non-transitory computer readable storage medium of claim 7, further including instructions stored thereon, which when read and executed by the one or more computer processors, cause the one or more computer processors to perform steps comprising:

masking sensitive information in the query before submitting the query to the large language model-based computer program.

* * * * *